(12) United States Patent
Malinouskaya et al.

(10) Patent No.: US 11,578,573 B2
(45) Date of Patent: Feb. 14, 2023

(54) METHOD FOR HYDROCARBON RECOVERY FROM AN UNDERGROUND FORMATION BY INJECTION OF A SALINE AQUEOUS SOLUTION COMPRISING A SURFACTANT

(71) Applicant: IFP Energies nouvelles, Rueil-Malmaison (FR)

(72) Inventors: Iryna Malinouskaya, Rueil-Malmaison (FR); Christophe Preux, Rueil-Malmaison (FR); Adeline Martin, Rueil-Malmaison (FR); Aline Delbos, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 17/307,728

(22) Filed: May 4, 2021

(65) Prior Publication Data

US 2021/0372247 A1    Dec. 2, 2021

(30) Foreign Application Priority Data

May 29, 2020    (FR) ...................................... 2005675

(51) Int. Cl.
*E21B 43/20* (2006.01)
*C09K 8/584* (2006.01)

(52) U.S. Cl.
CPC .............. *E21B 43/20* (2013.01); *C09K 8/584* (2013.01)

(58) Field of Classification Search
CPC ................................ E21B 43/20; C09K 8/584
(Continued)

(56) References Cited

U.S. PATENT DOCUMENTS

| 2006/0014650 A1* | 1/2006 | Campbell | ............. C09K 8/584 |
| | | | 166/305.1 |
| 2014/0008271 A1* | 1/2014 | Moene | .................. B01D 17/08 |
| | | | 166/305.1 |

(Continued)

OTHER PUBLICATIONS

Preliminary Search Report and Written Opinion for FR 2005675, dated Feb. 10, 2021, together with English language machine translation of Written Opinion (13 pages).

(Continued)

*Primary Examiner* — William D Hutton, Jr.
*Assistant Examiner* — Ashish K Varma
(74) *Attorney, Agent, or Firm* — Fitch, Even, Tabin & Flannery, L.L.P.

(57) ABSTRACT

The invention relates to a method for recovery of hydrocarbons present in an underground formation by injection of a saline aqueous solution comprising at least one surfactant, by means of a numerical flow simulator including a model of the evolution of the interfacial tension between the saline aqueous solution and the hydrocarbons as a function at least of salinity, wherein the interfacial tension evolution model is calibrated as follows: i) carrying out interfacial tension measurements for a plurality of emulsions having distinct salinity values corresponding at least to the optimum salinity, to two salinities bounding the optimum salinity in a 5-10% limit, to the zero salinity and to the solubility limit of the salts; ii) determining the constants of the interfacial tension evolution model by minimizing a difference between the model and the interfacial tension measurements.

7 Claims, 1 Drawing Sheet

(58) Field of Classification Search
USPC .................................................. 166/305.1
See application file for complete search history.

(56) References Cited

U.S. PATENT DOCUMENTS

| | | | |
|---|---|---|---|
| 2014/0041875 A1* | 2/2014 | Bourrel | E21B 43/16 |
| | | | 166/305.1 |
| 2014/0096967 A1* | 4/2014 | Sharma | C09K 8/584 |
| | | | 166/305.1 |
| 2016/0264847 A1* | 9/2016 | Weerasooriya | C07C 305/06 |

OTHER PUBLICATIONS

Leray, Sarah, et al., "Multi-objective assisted inversion of chemical EOR corefloods for improving the predictive capacity of numerical models", J. of Petroleum Sci. and Eng., 146 (2016), pp. 1101-1115.
Kumar, Bikky; "Effect of salinity on the interfacial Tension of model and crude oil systems," Sep. 13, 2012, pp. 1-147, University of Calgary Digital Repository, The Vault: Electronic Theses and Dissertations.

\* cited by examiner

[Fig 1]
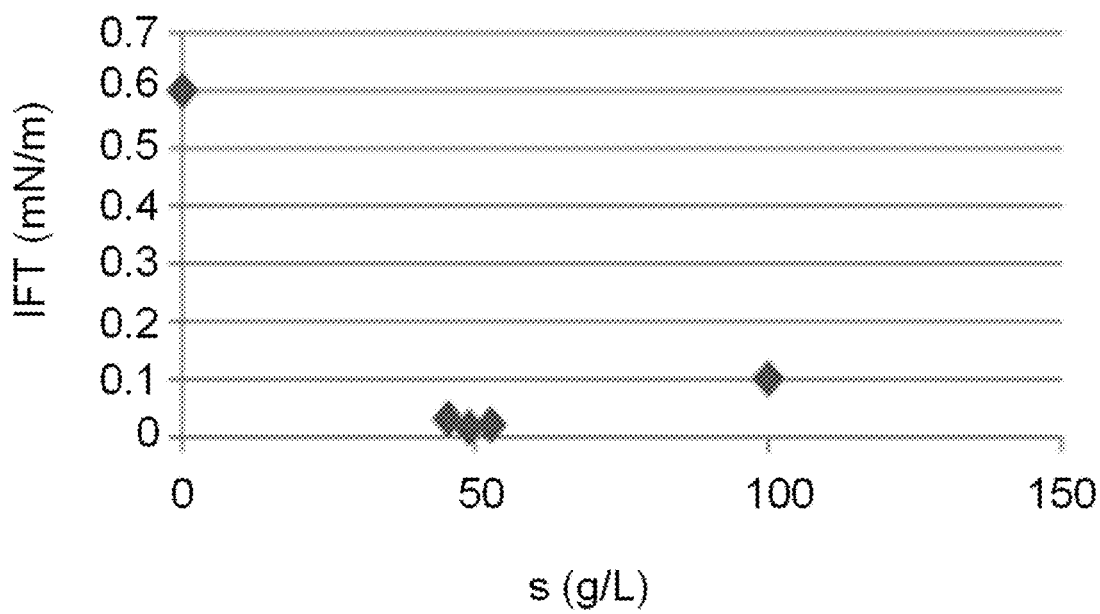
[Fig 2]
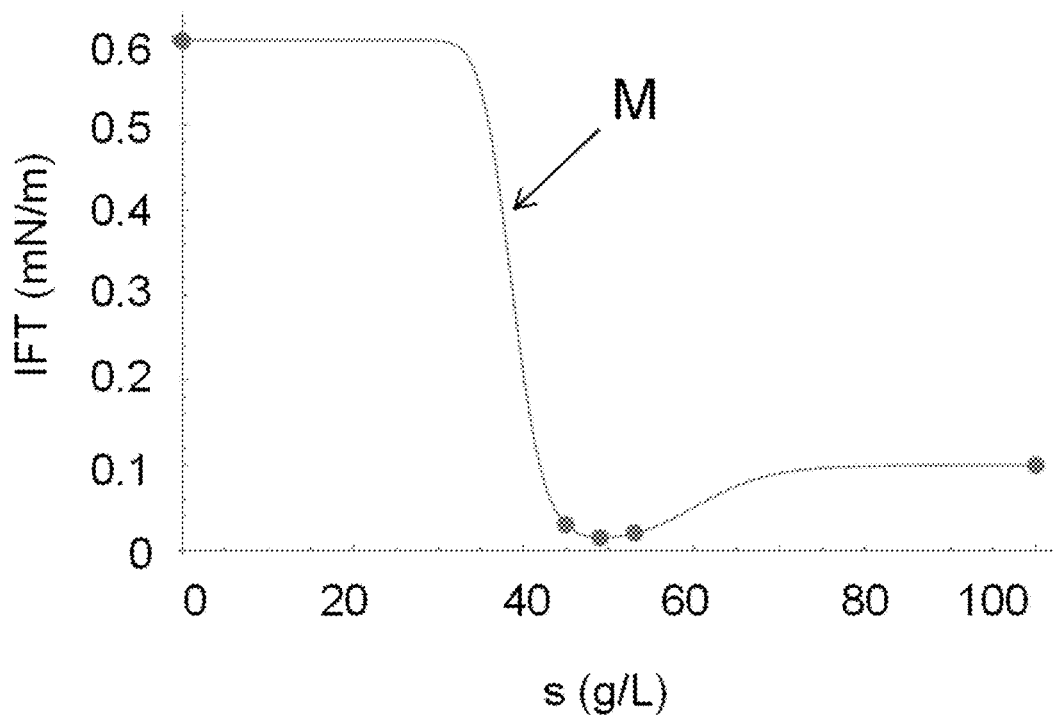

METHOD FOR HYDROCARBON RECOVERY FROM AN UNDERGROUND FORMATION BY INJECTION OF A SALINE AQUEOUS SOLUTION COMPRISING A SURFACTANT

CROSS-REFERENCE TO RELATED APPLICATIONS

This application claims priority from French Patent Application No.: 2005675, filed May 29, 2020, the entire content of which is hereby incorporated herein by reference.

FIELD OF THE INVENTION

The present invention relates to the field of recovery of hydrocarbons contained in an underground formation by injection of a saline aqueous solution comprising a surfactant, for exploitation of the hydrocarbons contained in this underground formation or decontamination of the formation polluted by the hydrocarbons present therein.

Development of a petroleum reservoir by primary recovery consists in extracting, via a so-called production well, the oil present in the reservoir via the overpressure naturally prevailing within the reservoir. This primary recovery only enables access to a small amount of the oil contained in the reservoir, of the order of 10% to 15% at most.

To enable the continuation of oil extraction, secondary production methods are implemented when the reservoir pressure becomes insufficient to displace the oil still in place. Notably, a fluid is injected (reinjection of produced water, diluted or not, seawater or river water injection, or gas injection for example) into the hydrocarbon reservoir so as to exert within the reservoir an overpressure likely to cause the oil to flow into the production well(s). A usual technique in this context is water injection, also referred to as water flooding, where large volumes of water are injected under pressure into the reservoir via injection wells. The injected water moves part of the oil it encounters and drives it towards one or more production wells. Secondary production methods such as water flooding however allow only a relatively small part of the hydrocarbons in place to be extracted (typically of the order of 30%). This partial sweep is notably due to oil entrapment by capillary forces, due to viscosity and density differences between the injected fluid and the hydrocarbons in place, and due to heterogeneities at microscopic or macroscopic scales (pore scale and reservoir scale).

There are various techniques known as enhanced oil recovery (EOR) methods for recovering the rest of the oil remaining in underground formations after implementing primary and secondary production methods. Examples of such techniques are methods related to the aforementioned water flooding, but using a water comprising additives such as surfactants.

Indeed, generally, the presence of a surfactant causes a modification of the interfacial tension between the water and the oil, more precisely a decrease in the interfacial tension. Applied to the field of enhanced oil recovery, the water-oil interfacial tension thus reduced allows to "wash" the rock and thereby to recover part of the oil still in place. Injection of surfactant-containing water therefore is a very relevant alternative to the injection of water alone into geological reservoirs comprising hydrocarbons.

BACKGROUND OF THE INVENTION

The following documents are mentioned in the description hereafter:

C. Preux, I. Malinouskaya, Q. L. Nguyen, E. Flauraud, and S. Ayache, Reservoir-Simulation Model with Surfactant Flooding Including Salinity and Thermal Effect, Using Laboratory Experiments, SPE Reservoir Characterisation and Simulation Conference and Exhibition, 17-19 September, Abu Dhabi, UAE, 2019.

C. Huh, Exxon production Research Company, Interfacial tensions and solubilizing ability of a microemulsion phase that coexists with oil and brine, 1979, 19p.

Vonnegut, B. Rotating bubble method for the determination of surface and interfacial tensions. Rev. Sci. Instr. 1942, 13, 6-16.

WINSOR (P.).—Solvent properties of amphiphilic compounds. Butterworth Londres (1954).

Leroy, S., Douarche, F., Tabary, R., Peysson, Y., Moreau, P., Preux, C. (2016). Multi-objective assisted inversion of chemical EOR corefloods for improving the predictive capacity of numerical models. Journal of Petroleum Science and Engineering, 146, pp 1101-1115. https://doi.org/10.1016/j.petrol.2016.08.015.

Petroleum reservoir exploitation consists in determining the reservoir zones with the best petroleum potential, in defining hydrocarbon recovery schemes for these zones (in order to define the recovery type, the number and positions of the exploitation wells allowing optimum hydrocarbon recovery), in drilling exploitation wells and, in general terms, in putting in place the production Infrastructures necessary for reservoir development.

In the case of enhanced recovery by injection of a saline aqueous solution comprising at least one surfactant, a scheme for recovering the hydrocarbons contained in the formation is defined. Generally, a scheme for oil recovery from an underground formation may require numerical simulation, in the most realistic manner possible, of the flow of this aqueous solution comprising the surfactant through the underground formation considered. Such a simulation is performed using a flow simulator comprising a displacement model for the aqueous solution containing the surfactant, also commonly referred to as "surfactant displacement model".

Conventionally, the surfactant displacement model is based on the assumption that the interfacial tension of the surfactant-containing water decreases. Thus, a flow simulator capable of simulating the flow of a saline aqueous solution comprising at least one surfactant through an underground formation containing hydrocarbons includes a model of the evolution of the interfacial tension between the water (the saline aqueous solution comprising a surfactant) and the oil (hydrocarbons).

As described in the document (Preux et al., 2019), the interfacial tension of a water-oil-surfactant system notably depends on at least one parameter such as the salinity of the saline aqueous solution, the surfactant concentration and/or temperature.

Construction of an interfacial tension evolution model generally consists in performing laboratory measurements for different parameter values (different salinity values for example) and in seeking the constants of an analytical expression for an interfacial tension evolution model according to this or these parameter(s) allowing the model thus calibrated to best adjust the measurements performed.

In the case of surfactant concentration dependence of the interfacial tension, which is a well-known behaviour in the literature, the interfacial tension just needs to be measured for one or two concentration values corresponding to minimum interfacial tensions. Indeed, the curves showing the determination of the critical micelle concentration (CMC)

are sufficiently known to require determining only the points of the interfacial tension at CMC and of the interfacial tension at Infinity.

The same applies to the temperature dependence of the interfacial tension: to calibrate the models commonly used so far, the measurements just need to be performed at the temperature of the underground formation and at the temperature of the underground formation surface.

As regards the salinity dependence of the interfacial tension evolution, the current models known from the literature are simplified models. For example, the document (Leray et al., 2016) describes a correlation of the interfacial tension with the salinity of symmetric form with respect to a characteristic salinity value, known as optimum salinity (see definition below). However, a wide range of surfactants does not take part in a symmetric evolution of the interfacial tension as a function of salinity, in relation to the optimum salinity.

Moreover, the interfacial tension is generally not constant in an underground formation and it is different from the interfacial tension of the injected water. Determining a model representative of the evolution of the interfacial tension as a function of salinity is therefore complex.

One object of the invention is to determine a realistic model of the interfacial tension evolution as a function of the salinity of a saline aqueous solution comprising at least one surfactant, injected into an underground formation comprising hydrocarbons.

In particular, the present invention provides a rigorous method for calibration of the constants involved in an analytical expression of a model of the interfacial tension evolution as a function of salinity. In addition, this interfacial tension model calibration methodology allows to limit the number of laboratory experiments to be carried out.

Furthermore, the model according to the invention is applicable to surfactants having a non-symmetric behaviour with respect to the optimum salinity.

SUMMARY OF THE INVENTION

The invention relates to a method for recovery of hydrocarbons present in an underground formation by injection of a saline aqueous solution comprising at least one surfactant, by means of a numerical flow simulator including at least one model of the evolution of the interfacial tension between said saline aqueous solution and said hydrocarbons as a function at least of the salinity of said saline aqueous solution comprising at least said surfactant.

The method according to the invention comprises at least the following steps:

A) calibrating said model of the evolution of said interfacial tension between said saline aqueous solution and said hydrocarbons as a function of said salinity as follows:

a) determining an optimum salinity value for said saline aqueous solution comprising at least said surfactant, said optimum salinity being such that an emulsion consisting of a sample of said hydrocarbons and a sample of said saline aqueous solution comprising at least said surfactant and having a salinity corresponding to said optimum salinity value is a three-phase emulsion, b) preparing a plurality of emulsions consisting of a sample of said hydrocarbons and a sample of said saline aqueous solution comprising at least said surfactant, said emulsions having distinct salinity values corresponding to at least said optimum salinity, to two salinity values bounding said optimum salinity in a 5% to 10% limit of said optimum salinity, a zero salinity value and a salinity value corresponding to the water solubility limit of the salts of said saline aqueous solution, and measuring said interfacial tension for each of said emulsions, c) determining said model of said interfacial tension evolution as a function of said salinity by seeking constants of said model of said interfacial tension evolution by minimizing a difference between said model and said measurements of said interfacial tension, B) from at least said flow simulator including said calibrated model of the evolution of said interfacial tension as a function of the salinity of said saline aqueous solution comprising at least one surfactant, determining a scheme for recovery of said hydrocarbons from said underground formation and recovering said hydrocarbons from said underground formation according to said recovery scheme.

According to an implementation of the invention, said evolution model of said interfacial tension $IFT_{wo}$ between said saline aqueous solution and said hydrocarbons as a function of said salinity s can be defined with a formula of the type:

$$IFT_{wo}(s) = IFT_{Inf}\left(\frac{F(s)}{IFT_{Inf}}\right)^{1-\exp\left(-\frac{(s-s_0)^2}{(a+bs)^2 s_0^2}\right)}$$

with $$F(s) = \frac{-\text{Arctan}\left(\frac{s-s_0}{0.01}\right)}{\pi}(IFT_{Max} - IFT_{Min}) + \frac{(IFT_{Max} + IFT_{Min})}{2}$$

and values of said constants $IFT_{Inf}$, $IFT_{Min}$, $IFT_{Max}$, a and b of said evolution model of said interfacial tension can be determined as follows: i) assigning to said constants $IFT_{Inf}$, $IFT_{Min}$, $IFT_{Max}$, respectively the values of said measurements of said interfacial tension for said optimum salinity $s_0$, for said zero salinity and for said salt solubility limit, and ii) determining the values of said constants a and b by means of a regression method so as to adjust at least said measurements of said interfacial tension for said two salinity values bounding said optimum salinity.

According to an implementation of the invention, step a) can be carried out as follows: defining a plurality of salinity values for said saline aqueous solution comprising at least one surfactant, generating a plurality of emulsions consisting each of a sample of said hydrocarbons and a sample of said saline aqueous solution comprising at least said surfactant for one of said values of said plurality of salinity values, and determining said value of said optimum salinity by setting up a phase diagram as a function of salinity.

According to an implementation of the invention, said interfacial tension can be measured using the rotating drop method.

According to an implementation of the invention, said recovery scheme can comprise at least one site for at least one injection well and/or at least one production well, and said wells of said well site can be drilled by providing them with production Infrastructures.

The invention further relates to a use of the method as described above for decontamination of said underground formation.

The invention further relates to a use of the method as described above for exploitation of said hydrocarbons from said underground formation.

BRIEF DESCRIPTION OF THE FIGURES

Other features and advantages of the method according to the invention will be clear from reading the description hereafter of embodiments given by way of non limitative example, with reference to the accompanying figures wherein:

FIG. 1 shows an example of measurements of the interfacial tension between a saline aqueous solution comprising a mixture of surfactants and hydrocarbons for various salinity values of the saline aqueous solution, and FIG. 2 shows a model of the interfacial tension evolution as a function of salinity, determined by implementing the method according to the invention, complying with the interfacial tension measurements of FIG. 1.

DETAILED DESCRIPTION OF THE INVENTION

In general terms, one object of the invention is a method for recovery of hydrocarbons present in an underground formation, by injection of an aqueous solution comprising a surfactant or a mixture of surfactants.

The method according to the invention is implemented at least by means of a numerical flow simulator operated via IT resources such as a computer. The flow simulator according to the invention includes a displacement model of the aqueous solution comprising the surfactant, also referred to as "surfactant displacement model" of the flow simulator.

The surfactant displacement model according to the invention is based on at least one evolution model of the interfacial tension between the saline aqueous solution comprising at least one surfactant and the hydrocarbons, as a function of at least the salinity of the saline aqueous solution comprising at least one surfactant. A model is understood to be an analytical expression representative of the physical quantity of interest (in the present case, the interfacial tension) varying as a function of at least one parameter (in the present case, at least salinity). It is clear that the interfacial tension can depend not only on salinity, but also on the surfactant concentration, temperature, etc. However, the present invention only relates to the determination of a model of the interfacial tension evolution as a function of salinity, and not as a function of other parameters. The model of the interfacial tension evolution between the saline aqueous solution comprising at least one surfactant and the hydrocarbons as a function of the salinity of the saline aqueous solution comprising at least the surfactant is hereafter referred to as "model of the interfacial tension evolution as a function of salinity" for the sake of simplification. Besides, a flow simulator including a displacement model of the aqueous solution comprising the surfactant based on a model of the interfacial tension evolution as a function of salinity is hereafter referred to as "flow simulator including a model of the interfacial tension evolution as a function of salinity" for the sake of simplification.

The model of the interfacial tension evolution as a function of salinity according to the invention depends on constants. The method according to the invention comprises a step of determination (also referred to as calibration) of the constants involved in the model of the interfacial tension evolution as a function of salinity, this calibration being carried out according to interfacial tension measurements performed in the laboratory.

From at least the flow simulator including the calibrated model of the interfacial tension evolution as a function of the salinity of the saline aqueous solution comprising at least one surfactant, a scheme is determined for recovery of said hydrocarbons from said underground formation and said hydrocarbons are recovered from said underground formation according to said recovery scheme.

The method according to the invention requires:
a sample of the hydrocarbons contained in the underground formation studied,
a sample of the saline aqueous solution comprising the surfactant(s), and
a flow simulator including at least one model of the evolution of the interfacial tension between the saline aqueous solution comprising at least one surfactant and the hydrocarbons, as a function at least of the salinity of the saline aqueous solution comprising at least one surfactant (see below).

In general terms, the method according to the invention comprises at least the following steps:
1. Calibration of the interfacial tension evolution model
   1.1 Determination of the optimum salinity
   1.2 Interfacial tension measurements
   1.3 Calibration of the constants of the interfacial tension evolution model
2. Hydrocarbon recovery from the calibrated interfacial tension evolution model.

The various steps of the method according to the invention are detailed hereafter.

1. Calibration of the Interfacial Tension Evolution Model

This step consists in calibrating the constants of a model of the interfacial tension evolution as a function of salinity (see substep 1.3 described below), from laboratory measurements (see substep 1.1 and substep 1.2 described below).

1.1 Determination of the Optimum Salinity

This step consists in determining the value of the optimum salinity of the saline aqueous solution comprising at least said surfactant. As is well known, the optimum salinity of the saline aqueous solution comprising a surfactant is the salinity at which an emulsion prepared with oil and said saline aqueous solution has three phases (three-phase system). In other words, the optimum salinity is the salinity at which the aqueous solution allows the surfactant to be as poorly soluble in the aqueous solution as in the oil. Expressed differently, at optimum salinity, the surfactant(s) initially present in an aqueous solution are at the interface between the aqueous solution and the oil phase. Said in yet another way, the appearance of a bicontinuous intermediate phase between the oil and the aqueous phase indicates the salinity for which the interfacial tension is ultra low. This state is also referred to as a Winsor III type system.

According to an implementation of the invention, the optimum salinity as defined above is determined by setting up a phase diagram as a function of salinity, as described for example in the documents (Winsor, 1959; Huh, 1979). According to an implementation of the invention, a phase diagram as a function of salinity can be set up by analysing emulsions formed for salinity values of the saline aqueous solution increasing in regular steps (it is then referred to as salinity scan), the salinity of the emulsion of Winsor III type being then referred to as optimum salinity. Preferably, salinity scans are performed at constant surfactant concentration and/or at constant temperature, preferably at a temperature close to that of the underground formation or of the injected water, i.e. about 40° C.

According to an implementation of the invention, the optimum salinity of an aqueous solution can be determined as follows:
defining a plurality of salinity values. According to an implementation of the invention, a range of salinity values and at least one sampling step can for example be defined for this salinity value range. According to an implementation of the invention, the salinity value range can be between 0 g/L and 100 g/L, and it is sampled in a regular manner with a sampling step of 1 g/L. Alternatively, several distinct sampling steps, associated with distinct parts of the salinity value range, can be defined. Preferably, a finer sampling step is defined in a part of the salinity value range where the optimum salinity is expected. A finer sampling step in a part of the range around the expected optimum salinity value can improve the accuracy of determining the real optimum salinity value for the system of interest, generating a plurality of emulsions, each consisting of a sample of the hydrocarbons contained in the underground formation and a sample of the saline aqueous solution comprising at least the surfactant for a value of the plurality of salinity values defined above. According to an implementation of the invention, an emulsion is generated for a value of the plurality of salinity values by contacting a hydrocarbon sample and a saline aqueous solution sample for the salinity value of interest, contacting being for example performed in a slowly inverted test tube, examining the phases of each of said emulsions and determining at least, among said emulsions, the one having a three-phase system. The optimum salinity value is then set to the value of the salinity of this emulsion. According to an implementation of the invention, photographic images of each emulsion can be made regularly over time (for example once a day for at least 15 days), and the phases present in the various emulsions are automatically analysed by means of an image processing method applied to the photographic images of the emulsions taken over time. According to an implementation of the invention, the open source image processing software ImageJ can be used, which allows to detect interfaces (between the different phases here) and thus to estimate the volume of each phase. The photographic image of the emulsion with a central phase (i.e. with a phase above and a phase below) having the largest volume corresponds to the emulsion whose salinity is the closest to the optimum salinity.

Alternatively, the method described in the patent application filed under No. FR-20/01,859, whose main steps are listed below, can be carried out:

injecting into a vessel the two liquids (aqueous phase and organic phase) and the surfactant formulation with a predetermined salinity value, so as to form a two-phase system in which the first liquid comprises drops of the second liquid, in particular droplets, performing an optical measurement of at least the first liquid in the vessel to determine the presence of drops of the second liquid in the first liquid, and if the optical measurement determines the presence of drops in the first liquid, varying the salinity value in the vessel and repeating optical measurement step b), otherwise (if the optical measurement detects no drop in the first liquid), the salinity of the surfactant formulation that minimizes the interfacial tension (in other words, the optimum salinity) is the salinity for which the measurement in the first liquid does not determine the presence of a drop of the second liquid in the first liquid (i.e. the last salinity value considered).

1.2 Interfacial Tension Measurements

This substep consists in measuring the interfacial tension for a plurality of distinct emulsions consisting each of a sample of the hydrocarbons of interest and a sample of the saline aqueous solution comprising at least one surfactant, the emulsions having distinct salinity values corresponding at least to the five salinity values as follows: optimum salinity, two salinity values bounding the optimum salinity in a 5% to 10% limit of the optimum salinity (i.e. values close to the optimum salinity), and two salinity values corresponding to the zero salinity and (substantially) to the water solubility limit of the salts of the saline aqueous solution (i.e. values far from the optimum salinity). Substantially is understood to mean a salinity value very close to the solubility limit of the salts, within the limits of the measurement uncertainty.

In other words, the interfacial tension is measured for at least five distinct salinity values of a very wide salinity range, from the zero salinity to the solubility limit of the salts, with finer sampling of the salinity around the optimum salinity.

According to an implementation of the invention, the solubility limit of the salts conventionally used for hydrocarbon recovery from an underground formation, such as NaCl salts for example, is reached for a value of 360 g/L.

Advantageously, the interfacial tension can be measured for 10 distinct salinity values, including the aforementioned five salinity values. Increasing the number of measurements allows to increase the accuracy of the model of the interfacial tension evolution as a function of salinity according to the invention.

According to an implementation of the invention, the interfacial tension between the saline aqueous solution and the hydrocarbons of at least one emulsion can be measured by means of the rotating drop method. According to an implementation of the invention, the interfacial tension between the saline aqueous solution and the hydrocarbons can be measured using a tensiometer. Conventionally, the rotating drop method is applied as follows: an oil drop is injected into a glass capillary tube filled with water with a surfactant at a given temperature. The tube is rotated, which causes, under the action of the centrifugal force, an elongation of the drop along the rotation axis. According to the Vonnegut relation (see the document (Vonnegut, 1942)), and provided that the drop is at a minimum four times as long as it is high, the interfacial tension $IFT_{wo}$ depends on the minimum radius of the rotating drop r, on the angular velocity w and on the difference between the density of the heavy phase (aqueous phase) $\rho_L$ and of the light phase (organic phase) $\rho_l$ which can be expressed with a formula of the type:

$$IFT_{wo} = \frac{(r^3 w^2 (\rho_L - \rho_l)}{4}. \quad (1)$$

According to an alternative implementation of the invention, the interfacial tension between the saline aqueous solution and the hydrocarbons of at least one emulsion can be measured by means of the solubility ratios measurement and of Huh's law, which can be expressed with the formula as follows:

$$\gamma = \frac{0.3}{\sigma^2}$$

with $\gamma$ the interfacial tension between the oil and the water, and $\sigma$ the solubility ratio between the oil and the water. This relation uses an empirical parameter, $\sigma$, determined in a particular case of pure surfactants system (Huh, 1979), with the consequence that this method is less accurate than the rotating drop method, but it is easier to implement because it requires no specific instrument (a heated enclosure is sufficient).

At least five interfacial tension values are thus obtained at the end of this substep, measured for at least five different salinity values sampling a wide salinity range, including the zero salinity and the solubility limit of the salts, and sampling at least the salinity around the optimum salinity.

1.3 Calibration of the Constants of the Interfacial Tension Evolution Model

According to the invention, a model of the interfacial tension evolution as a function of salinity having a non-symmetric behaviour with respect to the optimum salinity is used.

According to an implementation of the invention, a model of the interfacial tension evolution $IFT_{wo}$ as a function of salinity S, which can be written with a formula as follows, is used:

$$IFT_{wo}(s) = IFT_{Inf}\left(\frac{F(s)}{IFT_{Inf}}\right)^{1-\exp\left(-\frac{(s-s_0)^2}{(a+bs)^2 s_0^2}\right)} \quad (2)$$

with $$F(s) = \frac{-\text{Arctan}\left(\frac{s-s_0}{0.01}\right)}{\pi}(IFT_{Max} - IFT_{Min}) + \frac{(IFT_{Max} + IFT_{Min})}{2}$$

where $IFT_{Inf}$, $IFT_{Min}$, $IFT_{Max}$, a and b are constants to be determined, according to the invention, from interfacial tension measurements performed in the previous step, and $s_0$ is the optimum salinity.

According to this implementation of the invention, the constants of the interfacial tension evolution model are determined as follows: $IFT_{Inf}$ corresponds to the measurement of the interfacial tension for optimum salinity $s_0$, $IFT_{Min}$, $IFT_{Max}$, respectively correspond to the interfacial tension measurements for the zero salinity and the water solubility limit of the salts, and a and b are determined by means of a regression method so as to adjust at least the interfacial tension measurements for the two salinity values bounding the optimum salinity.

According to an implementation of the invention, Wolfram's Mathematica software (UK) or any other similar software can be used to determine the constants of the interfacial tension evolution model from the interfacial tension measurements performed in the previous substep.

A calibrated model of the interfacial tension evolution as a function of salinity is thus obtained at the end of this substep, i.e. an analytical expression for the interfacial tension evolution as a function of salinity.

From such a model incorporated in a surfactant displacement model, itself incorporated in a flow simulator, it is then possible to numerically predict notably hydrocarbon productions according to various recovery schemes, and thus to determine how to recover the hydrocarbons in the underground formation of interest, as described in the next step below.

2. Hydrocarbon Recovery from the Calibrated Interfacial Tension Evolution Model

This step consists in determining at least one recovery scheme for the hydrocarbons contained in the underground formation, whether for exploitation of these hydrocarbons or for decontamination of the underground formation containing these hydrocarbons.

This recovery of hydrocarbons from the underground formation studied can be performed within the context of an exploitation of hydrocarbons from the underground formation or within the context of a decontamination of the underground formation.

In general terms, a scheme for hydrocarbon recovery from an underground formation is characterized by a geometry and a site (position, spacing and number) for the injection and production wells. A hydrocarbon recovery scheme however also comprises defining a recovery type. In the case of enhanced hydrocarbon recovery by injection of a saline aqueous solution comprising at least one surfactant, the recovery scheme can also be defined by a type and an amount of surfactant injected into the formation studied, and notably also by the salinity of the aqueous solution comprising the surfactant.

Within the context of the exploitation of hydrocarbons present in an underground formation, a hydrocarbon recovery scheme must for example enable a high rate of recovery of the hydrocarbons trapped in the formation, over a long development duration, requiring a limited number of wells to be drilled. Within the context of decontamination of an underground formation comprising unwanted hydrocarbons, a hydrocarbon recovery scheme must for example enable a high rate of recovery of the hydrocarbons trapped in the formation, over a short time, requiring a limited number of wells to be drilled.

According to the invention, determination of the hydrocarbon recovery scheme is achieved by means of a numerical flow simulation implementing the surfactant displacement model, itself incorporating the calibrated model of the interfacial tension evolution as a function of the salinity of the saline aqueous solution comprising at least one surfactant as described above. An example of a flow simulator (also referred to as reservoir simulator) allowing a surfactant displacement model to be taken into account is the PumaFlow® software (IFP Energies nouvelles, France). According to the invention, at any time t of the simulation, the flow simulator solves all of the flow equations specific to each grid cell and delivers values solutions to the unknowns (saturations, pressures, concentrations, temperature, etc.) predicted at this time t. This solution provides knowledge of the amounts of oil produced and of the state of the underground formation (distribution of pressures, saturations, etc.) at the time considered. By means of the surfactant displacement model determined in the previous steps, the flow simulator allows to reliably predict the displacement performances provided by the surfactant under various injection and salinity conditions.

According to an embodiment of the invention, various schemes are defined for recovery of the fluid from the formation studied, and at least one criterion such as the amount of hydrocarbons produced according to each of the various recovery schemes, the representative curve of the evolution of production over time in each well, etc., is estimated by means of the flow simulator including the surfactant displacement model determined at the end of the above steps. The scheme according to which the hydrocarbons in the reservoir will indeed be recovered can then correspond to the one meeting at least one of the evaluation criteria of the various recovery schemes.

In other words, the method according to the invention enables accurate simulation of the flows generated in an underground formation comprising hydrocarbons, into which a saline aqueous solution comprising at least one surfactant would be injected, for different surfactant types and amounts, different salinities of the aqueous solution comprising the surfactant, different production-injection well sites, etc. The method according to the invention then allows to determine, in a numerical and therefore inexpensive manner, a recovery scheme suitable for the recovery of hydrocarbons from a formation.

Then, once a recovery scheme selected, the hydrocarbons trapped in the formation are recovered in accordance with this recovery scheme, notably by injecting the aqueous solution comprising the surfactant, by drilling the injection and production wells of the recovery scheme thus determined, so as to produce the hydrocarbons, and by setting up the production Infrastructures required for development of the reservoir or decontamination of the soils. Notably the surfactant type, the concentration of this surfactant and the salinity of the aqueous solution comprising the surfactant have been predetermined by means of the method according to the invention.

It is understood that the recovery scheme can evolve over the duration of hydrocarbon recovery from a formation, according to formation-related knowledge acquired during recovery, or to improvements in the various technical fields involved in the recovery of hydrocarbons from an underground formation (advancements in the field of drilling, of enhanced oil recovery for example).

It is clear that the method according to the invention comprises steps carried out by means of an equipment (a computer workstation for example) comprising data processing means (a processor) and data storage means (a memory, in particular a hard drive), as well as an input-output interface that inputs data and outputs the results of the method.

In particular, the data processing means are configured to carry out the step of determining a scheme for recovery of the hydrocarbons contained in the formation, this step requiring a flow simulator implementing the calibrated surfactant displacement model as described above.

Furthermore, the invention relates to a computer program product downloadable from a communication network and/or recorded on a computer readable medium and/or processor executable, comprising program code instructions for implementing notably the step of determining a scheme for recovery of the hydrocarbons contained in the formation as described above, when said program is executed on a computer.

The invention further relates to a use of the method as described above for exploiting the hydrocarbons of the formation. Using the method according to the invention is particularly relevant for exploitation of the hydrocarbons of a formation because injection of at least one saline aqueous solution comprising at least one surfactant is efficient for hydrocarbon recovery, all the more so as the in-situ interfacial tension of the saline aqueous solution comprising at least one surfactant is suitable. Now, step 1) of the method according to the invention enables accurate modelling of such an interfacial tension of a saline aqueous solution comprising at least one surfactant.

The invention also relates to a use of the method described above for decontamination of an underground formation comprising hydrocarbons. Using the method according to the invention is particularly relevant for decontamination of an underground formation because injection of at least one saline aqueous solution comprising at least one surfactant allows the hydrocarbon-contaminated rock to be washed, and washing is all the more efficient as the in-situ interfacial tension of the saline aqueous solution comprising at least one surfactant is suitable. Now, step 1) of the method according to the invention enables accurate modelling of the cleaning power (interfacial tension) of a saline aqueous solution comprising at least one surfactant.

EXAMPLES

The advantages of the method according to the invention will be clear from reading the application example hereafter.

For this application example, a saline aqueous solution containing the following ions is used: NaCl, KCl, $CaCl_2$ $2H_2O$, $MgCl_2$ $6H_2O$. A mixture of sulfonated surfactants of AGES and IOS type is further added to this saline aqueous solution, at a concentration of 8 g/L. Besides, dodecane is used as the hydrocarbon. Indeed, dodecane is an EACN (Equivalent Alkane Carbon Number) whose interfacial properties are identical to those of oil. In other words, it is an alkane which, when contacted with a reference surfactant formulation, gives a microemulsion with the same salinities as oil.

The application of substeps 1.1 to 1.3 of the method according to the invention to the application example is described hereafter.

a) Determination of the Optimum Sanity

A salinity scan is performed by increasing the salt concentration of the aqueous solution from 0 g/L to 100 g/L, in steps of 5 g/L, except for salinities close to the expected optimum salinity value (about 50 g/L), for which a 1 g/L step is used. The salinity scans are carried out at a temperature close to that of the reservoir or of the injected water, i.e. 40° C.

The salinity scans are performed using Wheaton tubes into which 2 mL of each saline aqueous solution with the surfactant mixture described above and 2 mL of dodecane for the oil phase are poured. A photograph is taken just after contacting (i.e. after slowly inverting a tube), after 24 h, 48 h and 72 h. The ranges are placed in thermostat-controlled oven and kept for 21 days.

Analysis of the various phases in the tubes, after 21 days, allows to determine the optimum salinity, which is the salinity for which three distinct phases can be observed in the tube, the surfactant mixture being at the interface between the aqueous phase and the oil phase. For this application example, the analysis of the different phases in the tube leads to the conclusion that the optimum salinity is about 50 g/L. This analysis of the different phases in the tube was performed by analysing the photographic images automatically by means of the open source image processing software ImageJ. This software allows to detect interfaces (in the present case, between the different phases) and thus to estimate the volume of each phase.

b) Interfacial Tension Measurements

For this application example, the interfacial tensions of five emulsions formed for the five salinity values described in step 1.2 are measured with the rotating drop method.

More precisely, measurements of the interfacial tension between the aqueous phase and the oil phase are performed for saline aqueous solutions having salinities equal to:
  the optimum salinity, i.e. 50 g/L,
  two values bounding the optimum salinity, i.e. 47 g/L and 53 g/L,
  two values corresponding to the boundaries of the salinity range, i.e. 0 g/L and 100 g/L.

Prior to measuring the interfacial tensions with the rotating drop method, the density of the saline aqueous solution comprising the surfactant mixture is measured with a DMA 4500M density meter (Anton Paar, Austria) comprised of a thermostat-controlled oscillating U tube. A small volume of the saline aqueous solution comprising the surfactant mixture (1 to 2 mL) is therefore injected and the density of the mixture is measured. Above a temperature of 80° C., the pycnometer method is used. A pycnometer is a small flask whose dry mass and mass with water are known. The volume of the flask can therefore be deduced. Weighing is then performed with the solution whose density is sought, and the density d of the saline aqueous solution can thus be deduced with the formula as follows:

$$d = \frac{\text{solution mass}}{\text{water mass}}$$

The interfacial tensions are measured with a tensiometer of SVT20N type (Data Physics Instruments, Germany) for example, using the rotating drop method.

FIG. 1 shows the interfacial tension values IFT measured for the five salinity values s described above.

c) Calibration of the Model of Interfacial Tension Evolution as a Function of Salinity This application example uses the interfacial tension evolution model described by Equation 2 above.

According to this implementation of the invention, the constants of the model of the interfacial tension evolution as a function of salinity are defined as follows: the measurement of the interfacial tension for the optimum salinity (50 g/L) is assigned to constant $IFT_{Inf}$, the measurements of the interfacial tension for the zero salinity and the water solubility limit of the salts (0 g/L and 100 g/L) to constants $IFT_{Min}$, $IFT_{Max}$ and constants a and b are determined by means of a regression method so as to adjust the interfacial tension measurements for the two salinity values bounding the optimum salinity (47 g/L and 53 g/L). More precisely, constants a and b are determined using the Mathematica software, by calibrating the correlation defined by Equation 2 against the two salinity values close to the optimum salinity.

FIG. 2 shows a curve M corresponding to the calibrated model of the interfacial tension evolution as a function of salinity. It can be observed that this curve passes perfectly through the interfacial tension measurements (represented by points) performed for the five salinity values described above. It can also be observed that the model of the interfacial tension evolution as a function of salinity is clearly non-symmetric with respect to the optimum salinity (50 g/L), which was necessary to explain the measurements performed at zero salinity and at the salt solubility limit.

The method according to the invention thus allows to determine a realistic model of the interfacial tension evolution as a function of salinity, meeting the laboratory measurements. Furthermore, the method according to the invention allows to limit the number of laboratory experiments to be carried out.

The invention claimed is:

1. A method for recovery of hydrocarbons present in an underground formation by injection of a saline aqueous solution comprising at least one surfactant, by means of a numerical flow simulator including at least one model of the evolution of interfacial tension between the saline aqueous solution and the hydrocarbons as a function of at least the salinity of the saline aqueous solution comprising the at least one surfactant, the method comprising:

A) calibrating the at least one model of the evolution of the interfacial tension between the saline aqueous solution and the hydrocarbons as a function of the salinity as follows:

a) determining an optimum salinity value for the saline aqueous solution comprising the at least one surfactant, the optimum salinity being such that an emulsion containing a sample of the hydrocarbons and a sample of the saline aqueous solution comprising the at least one surfactant and having a salinity corresponding to the optimum salinity value is a three-phase emulsion, b) preparing a plurality of emulsions containing a sample of the hydrocarbons and a sample of the saline aqueous solution comprising the at least one surfactant, the plurality of emulsions having distinct salinity values corresponding to at least the optimum salinity, to two salinity values bounding the optimum salinity in a 5% to 10% limit of the optimum salinity, a zero salinity value and a salinity value corresponding to the water solubility limit of salt in the saline aqueous solution, and measuring the interfacial tension for each of the plurality of emulsions, c) determining the at least one model of evolution of the interfacial tension by seeking constants of the at least one model of evolution of the interfacial tension by minimizing a difference between the at least one model of evolution of the interfacial tension and the measurements of the interfacial tension, the at least one model of evolution of the interfacial tension being an analytical expression having a non-symmetric behavior with respect to optimum salinity, B) from at least the numerical flow simulator including the calibrated at least one model of the evolution of the interfacial tension, the numerical flow simulator being operated via an IT resource, determining a scheme for recovery of the hydrocarbons from the underground formation, and recovering the hydrocarbons from the underground formation according to the scheme for recovery, wherein the at least one model of evolution of the interfacial tension comprises a model of the evolution of the interfacial tension $IFT_{wo}$ between the saline aqueous solution and the hydrocarbons as a function of the salinity s defined with the following formula:

$$IFT_{wo}(s) = IFT_{Inf}\left(\frac{F(s)}{IFT_{Inf}}\right)^{1-\exp\left(-\frac{(s-s_0)^2}{(a+bs)^2 s_0^2}\right)}$$

with $$F(s) = \frac{-\text{Arctan}\left(\frac{s-s_0}{0.01}\right)}{\pi}(IFT_{Max} - IFT_{Min}) + \frac{(IFT_{Max} + IFT_{Min})}{2}$$

and values of constants $IFT_{Inf}$, $IFT_{Min}$, $IFT_{Max}$, a and b of the model of evolution of the interfacial tension are determined as follows: i) assigning to the constants $IFT_{Inf}$, $IFT_{Min}$, $IFT_{Max}$ respectively the values of the measurements of the interfacial tension for the optimum salinity $s_o$, for the zero salinity and for the salt solubility limit, and ii) determining the values of the constants a and b by means of a regression method so as to adjust at least the measurements of the interfacial tension for the two salinity values bounding the optimum salinity.

2. The method as claimed in claim 1, wherein a) determining an optimum salinity value includes: defining a plurality of salinity values for the saline aqueous solution comprising the at least one surfactant, generating a plurality of emulsions, each containing a sample of the hydrocarbons and a sample of the saline aqueous solution comprising the at least one surfactant for one of the values of the plurality of salinity values, and determining the value of the optimum salinity by setting up a phase diagram as a function of salinity.

3. The method as claimed in claim 1, wherein the interfacial tension is measured using the rotating drop method.

4. The method as claimed in claim 1, wherein the scheme for recovery comprises at least one site for at least one injection well and/or at least one production well, and the wells of the well site are drilled by providing them with production Infrastructures.

5. A method for decontamination of an underground formation, the method comprising the method for recovery as claimed in claim 1.

6. A method for exploitation of hydrocarbons from underground formation, the method comprising the method for recovery as claimed in claim 1.

7. The method as claimed in claim 1, wherein the IT resource comprises a computer.

\* \* \* \* \*